April 26, 1960  C. BRUNNER  2,934,660
BUS BAR MOUNTING ARRANGEMENT
Filed June 3, 1957

LEGEND:
BLADES FORMED-UP ALONG "A"
TWO HALVES PARTED ALONG "B"

INVENTOR.
CARL BRUNNER
BY John M. Calmafde
ATTORNEY

2,934,660
BUS BAR MOUNTING ARRANGEMENT

Carl Brunner, Floral Park, N.Y., assignor to Murray Manufacturing Corporation, Brooklyn, N.Y.

Application June 3, 1957, Serial No. 663,043

2 Claims. (Cl. 307—147)

This invention relates to bus bar mounting arrangements for load centers, and particularly to such arrangements which are adapted to accommodate a plurality of circuit breakers of the socket type.

Load centers of the "plug-in" type are known for accommodating socket type circuit breakers. Such load centers comprise several component parts such as bus bars with extending blades for engaging the circuit breakers, supporting bases for the bus bars, wire connectors, etc. In the known load centers, these component parts are designed specifically for, and are peculiar to a particular load center. In other words, parts such as the bus bars and supporting bases designed for one type of load center may not be interchanged with, or practically adapted for use in another type of load center. This lack of versatility in the design of such components is considered a first shortcoming of the known load centers.

A second shortcoming of the known arrangements resides in the design of the bus bars. The design is such that to prevent arcing between the bus bars, insulator covers are required. Such covers, of course, add to the expense of the load centers and the configuration of the covers does not lend itself to mass production application.

There is a trend today towards standardization in the electrical industry; that is, components are constructed out of standardized unit parts, sometimes called "building blocks," so that components of different designs may be constructed from the same basic unit parts. This type of construction is now referred to as "modular" construction.

This invention relates to a bus bar mounting arrangement constructed of standardized unit parts. The advantages of such construction are many. For example, the cost of tooling is minimized once the basic unit design is determined, storing is simplified since essentially the same basic unit parts are utilized in the construction of many different designs, and concomitantly, ordering and merchandizing are greatly simplified.

Specifically, it is an object of my invention to provide a bus bar mounting arrangement of the type mentioned, which may be constructed of one or more pairs of bus bars for servicing circuits of single pole and/or double pole, preferably, although not necessarily, 120/240 volts, alternating current circuits. In the arrangement comprising a plurality of pairs of bus bars, the arrangement is known as a split bus and comprises one section for use as a power distribution section and for feeding double pole power circuits and at least one other section for feeding single or double pole load circuits. If desired, the power distribution section which contains primarily double pole positions may include main disconnects for feeding the busses in the primarily single pole section (or sections).

It is a further object of my invention to provide bus bars of novel design so as to eliminate the necessity for the insulator coverings.

In accordance with one aspect of my invention, I provide a bus bar mounting arrangement useful in a load center comprising a pair of bus bars oppositely disposed and rigidly mounted on an insulator base. Each of the bus bars comprises a flat portion and a plurality of blade members projecting substantially perpendicular to the plane of the flat portion. The blades are shaped to extend in alignment between the pair of bus bars and are so positioned that adjacent blades project from opposite bus bars respectively. This aspect of my invention is characterized by shaping the blades and flat portions so that when the bus bars are mounted, the closest distance between a blade projecting from one bus bar and the nearest edge of the opposite bus bar exceeds the required "break-down" distance at which danger of arcing might occur for the magnitude of voltage applied to the bus bars.

In accordance with another aspect of my invention, the bus bar mounting arrangement comprises at least two pairs of bus bars; one pair being connected respectively to two wires carrying voltage of opposite polarity. The second pair of bus bars is physically separated from the first pair but adapted to be electrically connected thereto, through main disconnects, for branch circuit service.

The above-mentioned and other features and objects of this invention and the manner of attaining them will become more apparent and the invention itself will be best understood by reference to the following description of an embodiment of the invention taken in conjunction with the accompanying drawings, wherein.

Figures 1, 2:
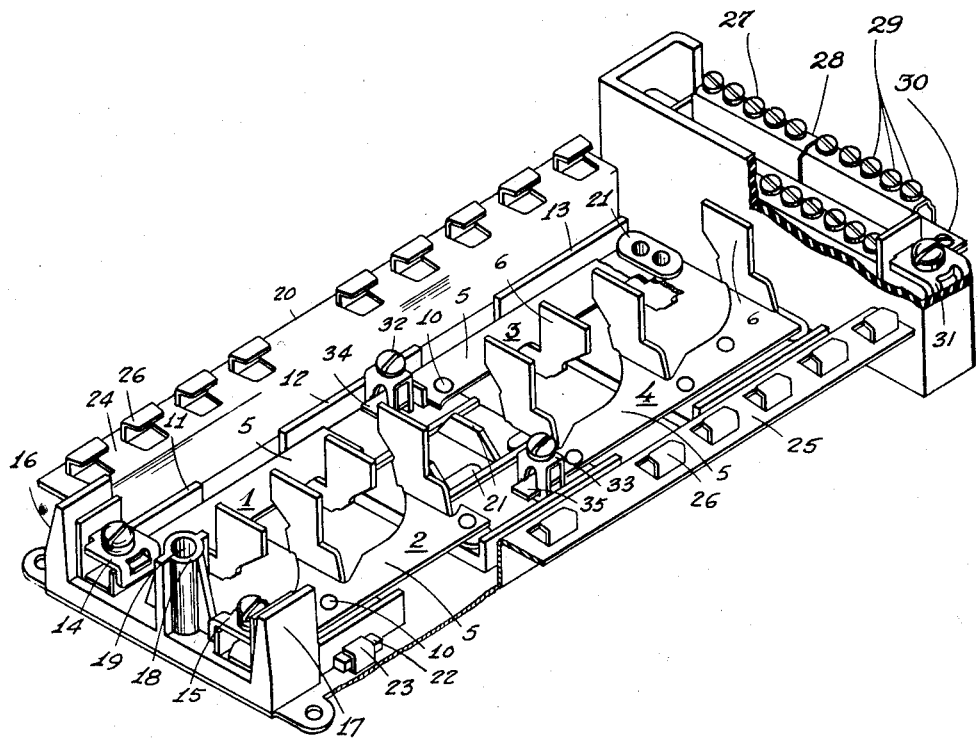
Fig. 1 is a perspective view of a split bus bar mounting arrangement.
Fig. 2 is a development of the bus bars.

Referring first to Fig. 1 there is disclosed a split bus bar mounting arrangement comprising at least two pairs of bus bars, 1—2, and 3—4. The bus bars of each pair are oppositely disposed and in alignment with the bus bars of the other pair. Additional pairs of bus bars may be utilized, depending on the types and number of circuits to be serviced. The illustrated arrangement is only by way of example.

Each of the bus bars comprises a flat portion 5 and a plurality of blade members 6 projecting substantially perpendicular to the plane of the flat portion 5. The blades 6 are preferably formed-up from the flat portion of the bus bar.

A development view of one pair of bus bars is shown in Fig. 2, wherein the basic blank design is illustrated on a width of copper strip. The width and thickness of the copper strip are selected to provide bus bars with a predetermined current carrying capacity.

In accordance with my invention the blanking design is such that the bus bars may be utilized without additional insulator covering. The portions which remain flat after processing are shown at 7 and those which are formed-up into contact blades are shown at 8. The areas indicated at 9 represent the stamped-out parts after the first stage of processing.

Long strips of copper are interlock-blanked so as to minimize the amount of scrap. From these long bus blank strips, bus sections of predetermined lengths are parted off. These sections are a first standardized unit part. While parting, the ends of the sections are also shaped to receive other parts, such as wire connectors.

The design of the bus blank is unique in two respects. First, the design of the blank provides the necessary spacing between busses of opposite polarity after they are processed and mounted on supporting bases; and second, the blank layout permits the busses to be arranged so that adjacent contact blades are connected to opposite busses.

To increase the current carrying capacity of the busses, wide copper strips may be used. However, the additional width should be added to the outer straight edge of the bus strips, to maintain the novel design along the inside edge. The additional width may be flat or formed-up, however, the formed-up surface dissipates the heat more effectively because the turned-up side is free of any adjoining surface such as the base. The current carrying capacity can also be increased by superimposing a copper strip of any suitable design on the basic strip.

Referring again to Fig. 1, the bus bars 1—2 are rigidly mounted, preferably by rivets 10, on insulating bases 11, 12, and the bus bars 3—4 are similarly mounted on bases 12 and 13. The base 11 in addition to supporting the busses provides mounting support for a pair of lay-in wire connectors 14, 15. The connectors are protected by insulation on the outside by wing-like extensions 16, 17. Located between the inside surfaces of the connectors is an insulation post 18, which is bored at 19, to accommodate a screw for mounting the base to a bridge member 20.

The bases are provided with raised portions, as shown for example, at 21, which serve as platforms for the bus bars, and also to increase the surface leakage path between opposite busses.

The base constitutes a second standardized unit part. By using one or more of either type of base, various lengths of bus assemblies can be fabricated, straight line arrangements and sectionalized.

The base and bus bar assembly is mounted on the bridge member 20, by means of lips 22, moulded on both sides of each of the bases, 11, 12, 13 fitting snugly under holding ears 23 struck-up from the bridge 20. The assembly is then rigidly secured to the bridge by means of the screw located in the post 18 which is threaded into the bridge 20.

The profile of the bridge member is in the shape of a U with the upper ends 24, 25 thereof formed outwardly for proper height location of the circuit breakers. Holding ears 26 are struck-up along the formed ends 24, 25 and are properly spaced for breaker mounting. The location of the base ears 23 and the breaker mounting ears 26 may be varied as required by the specific design of the bus assembly.

At one end of the arrangement provision is made for neutral connectors shown generally at 27. The connectors may take any suitable design, but I prefer to use a steel sleeve 28 provided with a plurality of holes on the side thereof, for wire insertion and a corresponding number of tightening screws 29 for securing the wire to the connector. A copper strip 30 is securely mounted on the inside surface of the bottom of the sleeve 28 to provide the required conductivity. The copper strip 30 is connected at one end to a lay-in connector 31 for connection to the neutral wire. Several sleeve connectors may be utilized, depending on the number of circuits to be serviced.

In the sectionalized bus-bar arrangement illustrated in Fig. 1, power conductors (not shown) carrying voltage of opposite polarity are coupled to the connectors 14, 15. In a 120/240 volt system the voltage across busses 1—2 would be 240 volts. Since the power is applied directly to the first section, this section may be referred to as the power section. In the illustrated embodiment, the power section may serve four double-pole circuits by connecting two breakers on opposite sides of each pair of blades. The other section of the illustrated arrangement is capable of servicing ten single pole (120 volt) circuits or four double pole and two single pole, etc.) by connecting breakers to both sides of each blade, the return from the load being connected to the neutral connector. Each of the circuit breakers engages about one-half of the blade and extends to the appropriate holding ear 26 whereby it is retained to the bridge.

If the power section is utilized to service four double-pole circuits, then a connection may be made from the connectors 14, 15 to connectors 32, 33 to feed the busses 3—4. The connectors 32, 33 are secured to raised tongue portions 34, 35 integral with the bus bars 3, 4. In this type of arrangement, the load center must be protected by a main disconnect. Therefore, in accordance with accepted practice, the wires connected to connectors 14, 15 would be connected to the load side of the main disconnect.

Alternatively, if desired, one double pole connection in the power section may be employed to protect the 10 single pole positions. Other combinations of bus assemblies can readily be envisaged for servicing a larger or lesser number of double pole and/or single pole circuits and for utilizing one section as a main disconnect for the other section.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A bus bar mounting arrangement useful in a load center, comprising a pair of bus bars, an insulator base, each of said bus bars comprising a flat portion and a plurality of integral blade members projecting substantially perpendicular to the plane of said flat portion, means mounting the flat portions of said bus bars on said insulator base, the bus bars being oppositely disposed and positioned so that the blade members extend in alignment between the pair of bus bars and adjacent blades project from opposite bus bars respectively, and the flat portions of said bus bars being arcuate in shape between adjacent blade members, the arc extending away from the oppositely disposed blade member so that the closest distance between the blades projecting from one bus bar and the nearest edge of the opposite bus bar exceeds the required breakdown distance at which arcing might occur for the voltage applied to said bus bars.

2. A bus bar mounting arrangement useful in a load center, comprising at least two pairs of bus bars, the bus bars of each pair being oppositely disposed and in alignment with the other pair, each of said bus bars comprising a flat portion and a plurality of formed-up integral blade members extending substantially perpendicular to the plane of said flat portion, means mounting the flat portions of said bus bars on said insulator base, the blades being shaped to extend in alignment approximately halfway between opposite bus bars and so positioned that adjacent blades extend from opposite bus bars respectively, and the flat portions of said bus bars being arcuate in shape between adjacent blade members, the arc extending away from the oppositely disposed blade member so that the closest distance between the blades extending from one bus bar and the nearest edge of the opposite bus bar exceeds the required breakdown distance at which arcing might occur for the voltage applied to said bus bars.

References Cited in the file of this patent

UNITED STATES PATENTS

| | | |
|---|---|---|
| 2,007,174 | Benjamin | July 24, 1935 |
| 2,570,229 | Hammerly et al. | Oct. 9, 1951 |
| 2,738,445 | Hammerly et al. | Mar. 13, 1956 |
| 2,738,446 | Fleming | Mar. 13, 1956 |
| 2,738,473 | Johnson | Mar. 13, 1956 |